(No Model.)
T. J. LEWIS & A. A. STEVENSON.
CAR WHEEL.
No. 589,356. Patented Aug. 31, 1897.
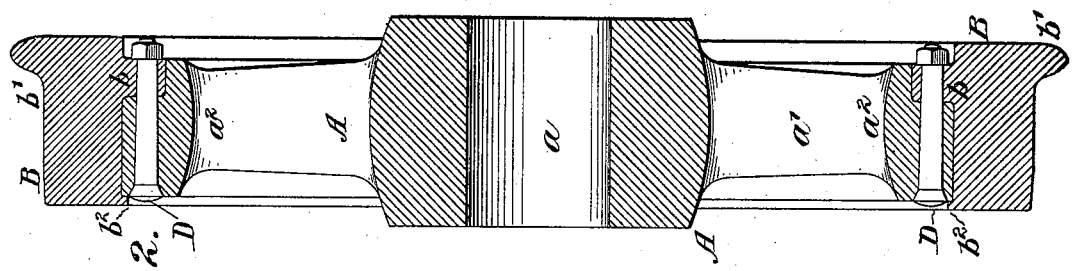
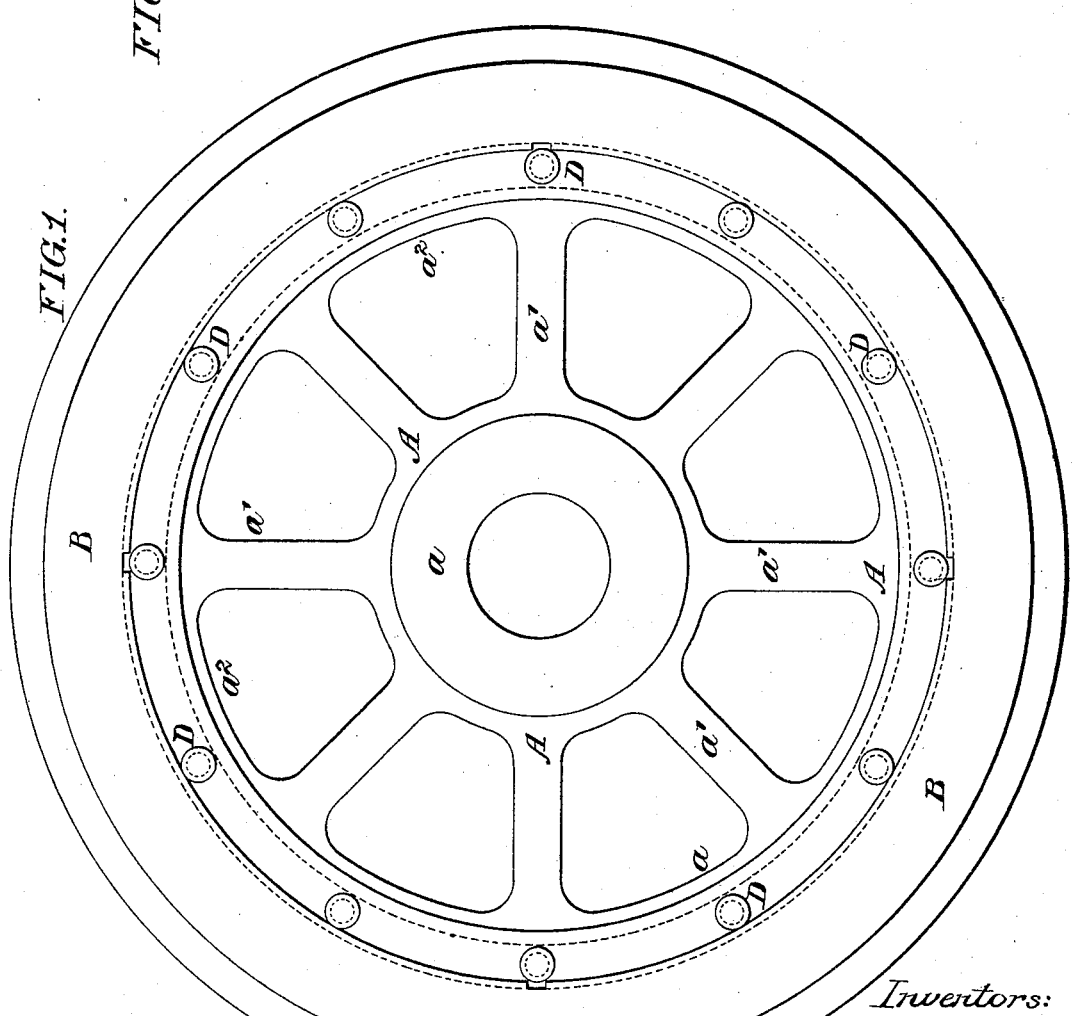
Witnesses:
Murray C. Boyer
Charles DeCow.
Inventors:
Theodore J. Lewis
and Archy A. Stevenson
by their Attorneys,

UNITED STATES PATENT OFFICE.

THEODORE J. LEWIS, OF PHILADELPHIA, AND ARCHY A. STEVENSON, OF BURNHAM, PENNSYLVANIA, ASSIGNORS TO THE STANDARD STEEL WORKS, OF BURNHAM, PENNSYLVANIA.

CAR-WHEEL.

SPECIFICATION forming part of Letters Patent No. 589,356, dated August 31, 1897.

Application filed November 7, 1896. Serial No. 611,417. (No model.)

*To all whom it may concern:*

Be it known that we, THEODORE J. LEWIS, of Philadelphia, and ARCHY A. STEVENSON, of Burnham, Pennsylvania, citizens of the United States, have invented certain Improvements in Car-Wheels, of which the following is a specification.

The object of our invention is to construct a built-up car-wheel in such a manner that the rim will be securely fastened to the center, and a further object is to strengthen the tire directly back of the flange, as fully described hereinafter.

In the accompanying drawings, Figure 1 is a face view of a wheel, illustrating our invention. Fig. 2 is a sectional view.

A is the wheel-center, and B the flange. The wheel-center consists in the present instance of the hub $a$, the spokes $a'$, and the ring $a^2$. This ring has an annular recess in its periphery at one edge to accommodate an internal flange $b$ on the rim-section B. This flange is preferably situated on the same side of the rim as the external flange $b'$ of the wheel, so as to materially strengthen the rim at this point.

The rim-section is secured to the center by the shrinking process, and after the rim and ring are adjusted bolts D, preferably tapered, are inserted in the bolt-holes of the ring-section of the center and the inner flange of the rim. These bolts have preferably tapered heads and are provided with suitable nuts.

In order to relieve the bolts from longitudinal strains in the event of the rim becoming loose on the center, we form a slight annular rib $b^2$ on the rim, which overlaps the ring portion of the center. This rib is preferably of such a height that when the rim is expanded prior to being fitted to the center the center will readily pass the rib to its seat, and when the rim is shrunk the rib will lock the two parts together laterally, after which the several bolts are placed in position.

If necessary, after the parts are placed in position the rib may be hammered down onto the face of the center to make a neat fit, although this is not absolutely necessary.

We claim as our invention—

1. The combination in a wheel, of the center having an annular recess in its periphery, a rim or tire having an internal flange adapted to said recess and bolts securing the rim and center together said internal flange being on the same side as the flange of the wheel, substantially as described.

2. The combination of the wheel-center having a recess in one side of its periphery, a rim or tire having an internal flange adapted to the said recess, said internal flange being on the same side as the flange of the wheel, a rib on the opposite edge overlapping the wheel-center and means for securing the parts together, substantially as described.

3. The combination of the wheel-center having an annular recess in its edge, a flanged rim or tire having an internal flange adapted to the recess of the center and having an annular rib overlapping the wheel-center, said internal flange being on the same side as the flange of the wheel, and transverse bolts passing through the center and through the internal flange of the rim-section, substantially as described.

4. As a new article of manufacture, a rim-section for car-wheels having a deep internal flange on one side, perforated for the reception of bolts, and an annular shallow rib on the opposite side, said rib being of such a height that the wheel-center will pass the rib when the rim-section is expanded by heat during the process of manufacture, substantially as described.

In testimony whereof we have signed our names to this specification, in the presence of two subscribing witnesses.

THEO. J. LEWIS.
ARCHY A. STEVENSON.

Witnesses:
WM. S. MESSEMER,
M. T. SNYDER.